May 22, 1951   A. C. DOBRICK   2,553,813
WING NUT
Filed May 16, 1945
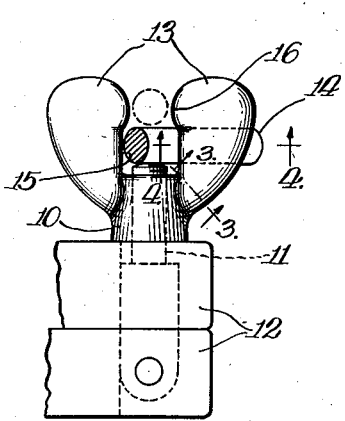
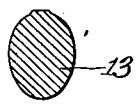
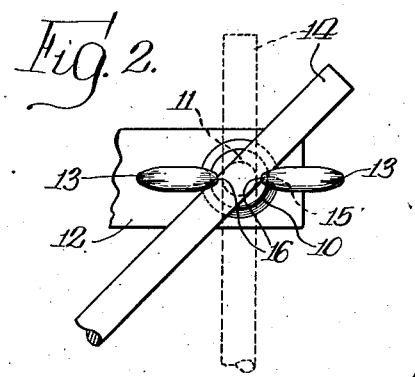
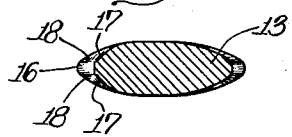
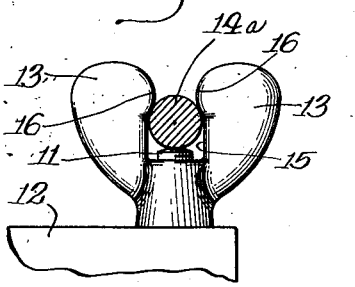
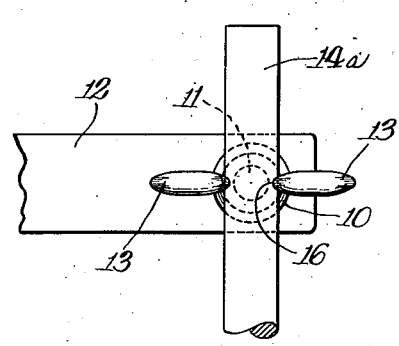
INVENTOR.
August C. Dobrick,
BY
his Attys.

Patented May 22, 1951

2,553,813

UNITED STATES PATENT OFFICE 2,553,813

WING NUT

August C. Dobrick, Chicago, Ill., assignor to The Imperial Brass Manufacturing Company, Chicago, Ill., a corporation of Illinois Application May 16, 1945, Serial No. 594,097

3 Claims. (Cl. 85—32)

The invention relates to wing nuts and has as a general object to provide a wing nut of new and improved construction.

Wings are customarily employed where the nut is to be frequently applied and removed or at least tightened and loosened, with such tightening and loosening customarily requiring only the force that may be exerted by the fingers of the hand of an individual manipulating the nut. In some instances, however, it is necessary that the nut be drawn up a little bit tighter than can be done by grasping the nut with the fingers only. Under those circumstances, it is not uncommon that the workman attempts to obtain that added torque by inserting between the wings of the nut a rod, screw driver, or any other rod-like implement that happens to be handy.

In the past, this expedient of obtaining additional torque for drawing up the nut has met with difficulty because the wings of the nut were so shaped as to tend to cam the rod outwardly as rotative force was applied to the rod. It is an object of this invention, therefore, to provide a wing nut constructed to facilitate the employment therewith of a rod or the like for tightening the nut to a greater degree than is possible by mere hand gripping of the nut.

Another object is to provide a wing nut having its wings so constructed as to provide therebetween a space in which a rod may be received by movement thereof axially of the wing nut when the rod is held substantially at right angles to the plane of the wings and in which the rod is held against outward movement when occupying a position oblique to the plane of the wings, that is, when the rod is rotated to turn the nut.

Other objects and advantages will become apparent from the following detailed description taken in connection with the accompanying drawings, in which:

Fig. 1 is a side elevational view of a wing nut embodying the features of this invention. Also shown in broken-line outline is a rod in process of insertion between the wings of the nut and a broken-off rod in nut-rotating position.

Fig. 2 is a top plan view of Fig. 1.

Fig. 3 is a sectional view taken approximately along the line 3—3 of Fig. 1, on a scale twice that of Fig. 1.

Fig. 4 is a sectional view taken approximately along the line 4—4 of Fig. 1, on a scale twice that of Fig. 1.

Fig. 5 is a view generally similar to Fig. 1 but showing the employment of a rod larger in diameter than the restricted portion of the space between the wings of the nut.

Fig. 6 is a top plan view of Fig. 5.

While the invention may be susceptible of various modifications and alternative constructions, it is shown herein and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

In the embodiment of the invention shown for exemplary purposes, the wing nut comprises a body 10 which is very slightly truncated so as to have a frusto-conical shape. The body is, of course, bored and threaded internally to adapt it for threaded engagement with a bolt, such as shown at 11, herein adapted in conjunction with the nut to clamp two bars 12 together. Completing the nut are two wings 13 of identical and symmetrical construction. These wings have a diametrically opposed relation and project laterally and longitudinally of the body 10, the wings originating, that is, being secured to the body, adjacent the apex end thereof.

It is a feature of this invention that the inner edges of the wings 13 are so shaped that they not merely do not cam outwardly a rod, such as 14, inserted between the wings and rotated to turn the nut, but actually restrain the rod against loss by such movement longitudinally outwardly of the slot. The invention, moreover, contemplates such a construction in which the rod may be quickly and conveniently inserted or removed from between the wings of the nut by lateral movement of the rod longitudinally of the nut, as distinguished from endwise insertion of the rod radially of the nut. To those ends, each wing 13 herein has the general shape of a gourd flattened progressively from the point of attachment to the body to the free end of the wings. In other words, at the point of attachment to the body, each wing has, as best seen in Fig. 3, a generally oval cross section and from that point outwardly each wing is gradually reduced in thickness while increasing in radial width.

Immediately adjacent the end of the body 10 the inner edge of each wing is formed with a straight portion 15 substantially parallel with the axis of the body. Outwardly of this straight portion each wing is formed with an inwardly extending lobe 16 so that the inner edges of the wings thus shaped form a slot with a restricted neck or opening. Each wing at the straight portion 15, moreover, has beveled faces 17 on each side so that shoulders 18 are formed on the side faces of the wings where the beveled faces 17 merge with the lobe 16, as well as where the straight portion 15 merges with the lobe 16 at the very center line of the inner edge. The outer edge and the end of each wing are here shown gradually curved but may take any contour desirable from a manufacturing or appearance standpoint, for they do not enter into the functional operation of the wing nut.

The operation and the advantages of the invention herein disclosed can most readily be understood and appreciated from a brief description of the procedure that would be followed by a workman seeking to tighten the nut to an extent somewhat greater than he is able to do with his fingers. Naturally the workman will draw the nut as tight as possible by rotating the same with his fingers. To tighten the nut beyond that point, he may employ any rod-like object 14, such as a screw driver, a spike, or any other object that happens to be handy and, while grasped in one hand, place the rod over the mouth of the slot formed between the wings with the rod substantially at right angles to the plane in which the wings lie. The rod will then have the position shown in broken-line outline in Fig. 1 and thus will readily pass downwardly through the restricted portion of the slot and into the enlarged portion defined by the straight portions 15 of the inner edges of the wings. With the rod still held in the hand, customarily with the index finger overlying the wing nut, the remaining fingers on one side of the rod and the thumb in extended position on the opposite side of the rod, the workman simply rotates the rod from its right-angular position to a position oblique to the plane of the wings, that is, into engagement with the wings at the straight portion 15 of the inner edges thereof. The rod now occupies the position in which the lobes 16 extend partially over the rod and prevent its longitudinal removal from the slot. Moreover, the shoulders 18 formed on the sides of the wings due to the beveled faces 17 engage and further aid in restraining the rod against outward movement tended to be caused by forces arising as an incident to turning of the nut through the medium of the rod. Usually the nut does not require more than a half turn to draw the same up to the degree desired. However, should more than a half turn be required, the workman without releasing the rod simply rotates the same to the right-angular relationship with respect to the wings, withdraws the same from the slot between the wings, and then, by movement of the wrist, rotates the rod through 180°, reinserts the same in the slot and imparts a further turn to the nut.

With this nut the workman is free to exert all of his strength and energy to imparting rotation to the nut, no strength need be diverted to holding the rod against being cammed outwardly of the slot, and neither is the workman confronted with the mental hazard of such slipping of the rod from the slot nor the actual physical hazard and the injuries that can result therefrom.

While, of course, the invention has its greatest advantages when the workman employs a rod having a diameter or thickness less than the distance between the lobes 16, it is still advantageous even when the workman employs a rod, such as shown at 14a in Figs. 5 and 6, which has a diameter larger than the space between the lobes 16. When such a rod is employed it must, of course, be inserted by endwise movement of the rod radially of the nut with consequent loss of time. Nevertheless the nut still affords the advantages that the rod cannot be cammed outwardly and that, therefore, the workman is free to devote all of his strength to rotation of the nut without diverting a portion of his energy to holding the rod against such outward camming and, moreover, there is no danger that the rod will suddenly and unexpectedly be forced out of the slot with the resultant great possibilities of injury to the workman.

I claim as my invention:

1. A wing nut comprising a body having a threaded axial bore and a pair of diametrically opposed relatively thick wings projecting laterally and longitudinally of the body and of outwardly diminishing thickness, and lying in a plane diametrically of the body, each wing having an inner edge composed of a straight portion near the body of the nut extending substantially parallel with the axis of the body and an inwardly projecting lobe near the end remote from the body to form a restriction in the slot defined by the inner edges of the wings.

2. A wing nut comprising a body having a threaded axial bore and a pair of diametrically opposed wings projecting laterally and longitudinally of the body and lying in a plane diametrically of the body, each wing at the point of attachment to the body having a generally oval cross section and from that plane toward the free end reducing in thickness while increasing in radial dimension with the inner edge of the wing having immediately adjacent the body a straight portion lying substantially parallel with the axis of the body and terminating in a rounded lobe-forming portion, the straight portion of the inner edge of each wing being beveled on both side faces to have the rounded lobe-forming portion provide a shoulder on the sides as well as on the very center line of the inner edge.

3. A wing nut comprising a body having a threaded axial bore and a pair of diametrically opposed relatively thick wings of outwardly diminishing thickness projecting laterally and longitudinally of the body to terminate well beyond the adjacent end of the body and lying in a plane diametrically of the body, the inner edges of the wings defining a parallel sided slot adapted to receive a rod inserted by movement axially of the nut when held substantially at right angles to the plane of the wings, and shoulders formed on the inner edges of said wings spaced from but facing toward said body adapted to receive and substantially lock a rod against outward movement axially of the nut when occupying a position oblique to the plane of the wings.

AUGUST C. DOBRICK.

REFERENCES CITED

The following references are of record in the file of this patent:

UNITED STATES PATENTS

| Number | Name | Date |
|---|---|---|
| 36,023 | Philbrook | July 29, 1862 |
| 397,988 | Kimball | Feb. 19, 1889 |
| 1,212,318 | Boomer | Jan. 16, 1917 |
| 1,589,063 | Fondo | June 15, 1926 |
| 1,616,437 | Brock | Feb. 8, 1927 |
| 1,629,095 | Danly | May 17, 1927 |
| 2,049,104 | Charlton | July 28, 1936 |
| 2,259,834 | Schmidt et al. | Oct. 21, 1941 |
| 2,305,427 | Joachim | Dec. 15, 1942 |
| 2,383,141 | Maage | Aug. 21, 1945 |